US007062826B2

(12) United States Patent
Ho

(10) Patent No.: US 7,062,826 B2
(45) Date of Patent: Jun. 20, 2006

(54) SPECIAL TOOL FOR ASSEMBLING AND DISASSEMBLING A REMOTE -CONTROLLABLE MODEL-CAR ENGINE CLUTCH

(75) Inventor: Hung Kai Ho, Taichung (TW)

(73) Assignee: Golden Lion Enterprise Co., Ltd., Taichung Shien (TW)

( * ) Notice: Subject to any disclaimer, the term of this patent is extended or adjusted under 35 U.S.C. 154(b) by 0 days.

(21) Appl. No.: 10/790,672

(22) Filed: Mar. 3, 2004

(65) Prior Publication Data

US 2005/0193540 A1 Sep. 8, 2005

(51) Int. Cl.
*B23P 19/04* (2006.01)

(52) U.S. Cl. ........................................ 29/227; 29/240.5

(58) Field of Classification Search .................. 29/229, 29/227, 240.5, 290 E, 281.1, 281.5
See application file for complete search history.

(56) References Cited

U.S. PATENT DOCUMENTS 4,063,342 A * 12/1977 Mitchell et al. .............. 29/227

* cited by examiner

*Primary Examiner*—Robert C. Watson
(74) *Attorney, Agent, or Firm*—Troxell Law Office PLLC

(57) ABSTRACT

A special tool for assembling and disassembling a remote-controllable model-car engine clutch has a head, and a prying claw formed to extend up from the head. The prying claw has an engage groove laterally in an upper section and a pushing groove formed in an upper end surface. The engage groove of the prying claw pries open a torsion spring of each of plural grasps of a clutch for disassembling each grasp from a base fixed with an engine. The pushing groove of the prying claw pries open the torsion spring and then assembles each grasp of the clutch one by one on the base. The special tool has double functions, lowering its cost and package and facilitating handling of assembly and disassembly of an engine clutch.

8 Claims, 8 Drawing Sheets

SPECIAL TOOL FOR ASSEMBLING AND DISASSEMBLING A REMOTE -CONTROLLABLE MODEL-CAR ENGINE CLUTCH

BACKGROUND OF THE INVENTION

1. Field of the Invention

This invention relates to a remote-controllable model-car, particularly to a special tool for assembling and disassembling a model-car engine clutch.

2. Description of the Prior Art

A clutch 20 of a conventional remote-controllable model-car engine 10 shown in FIGS. 1 and 2, generally includes a circular base 21 to connect with a spindle 11 of the engine 10, three posts 211 fixed on an upper surface of the circular base 21 to fit in post holes 221 of three grasps 22 of the clutch 20, a torsion spring 23 positioned laterally in an intermediate section of each grasp and fitting around the post 211. The torsion spring 23 has a first end 231 fitting in a position groove 222 on an intermediate portion of outer surface of each grasp 22, and a second end 232 urging on an annular groove 121 of a nut 12 screwing with the spindle 11 so as to keep the grasps 22 in a normal condition so that the grasps 22 of the clutch 20 may rotate together with the spindle 11 owing to the inward force of the torsion spring 23 against the nut 12 during operation of the engine 10. When the engine 10 makes the spindle 11 rotate at a preset speed, the grasps 22 may motivated by centrifugal force to move outward to tightly contact a clutch cover 24 fixed on the end of the spindle 11 so that the clutch cover 24 may rotate together with the spindle 11 to transmit rotating force to a tire, which is then rotated to move the car forward or backward. So, in order to maintain the clutch cover 24 normally urging tightly the nut 12 inward, the torsion spring 23 should have a torque enough to always push against the nut 12. This torque may also form a kind of difficulty for assembling or disassembling the grasps 22 with the posts 211 of the circular base 21. As there was no special tool for this purpose, a common conventional tool such as a screwdriver was used as a tool to do it, requiring troublesome work and much time to result in not a little inconvenience.

Next, a Taiwan patent application of No. 10/424,860 titled "Disassembling device for a remote-controllable car engine clutch" by the same applicant of this invention includes a disassembling tool and an assembling tool. The disassembling tool has its upper end formed with three inclined sides, a groove respectively formed under the inclined sides. The three inclined sides push open one end of a torsion spring of each of three grasps of a clutch so that the three grasps may be separated from the posts of the base, finishing disassembling the clutch. The assembling tool has a pushing piece formed in an upper end of its body, a groove formed under the pushing piece for prying open one of the torsion spring to assemble the grasps with the posts of the base, with the one end of the torsion spring engaging with an annular position groove of a nut, positioning each grasp of the clutch on each post to finish assembling.

Nevertheless, the conventional disassembling tool and the conventional assembling tool of this case is deemed to have the following disadvantages.

1. The disassembling tool and the assembling tool are independent tools with different functions, not having common use, liable to be used wrongly and comparatively high in the cost.
2. Although the disassembling tool has three inclined sides for taking off the three grasps at the same time, but to pry open the torsion springs on the three grasps at once needs a comparatively large force, practically quite tough to perform.
3. As for common conventional clutches, to assemble them usually needs much force than to disassemble them, one end of the torsion spring may be liable to slide off the groove of the assembling tool when the tool pushes the torsion spring and the grasps on the posts of the base, quite unsmooth in finishing assembling.

SUMMARY OF THE INVENTION

This invention has been devised to offer a special tool for assembling and disassembling a remote-controllable model-car engine clutch, which has a prying claw formed to extend up from a head of the special tool. The prying claw has an engage groove formed laterally in an upper section and a pushing groove formed in an upper end surface and concave-shaped.

The engage groove and the pushing groove of the prying claw can be used both for assembling and disassembling an engine clutch of a remote-controllable model-car at the same time, quite convenient to use and improving the drawback of the conventional tool used for the same purpose.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
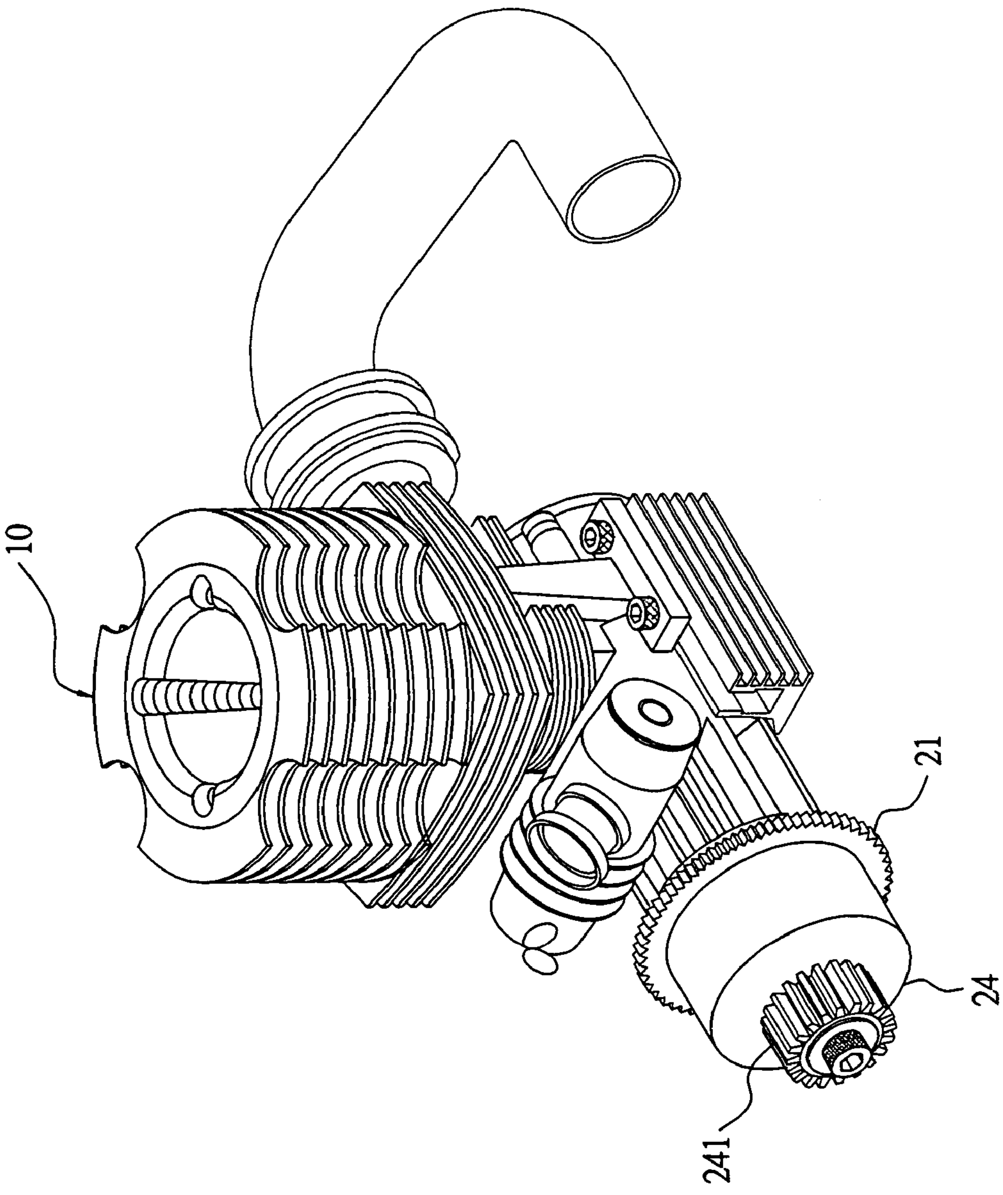
FIG. 1 PRIOR ART
FIG. 1 is a conventional clutch assembled with a model-car engine.
Figure 2:
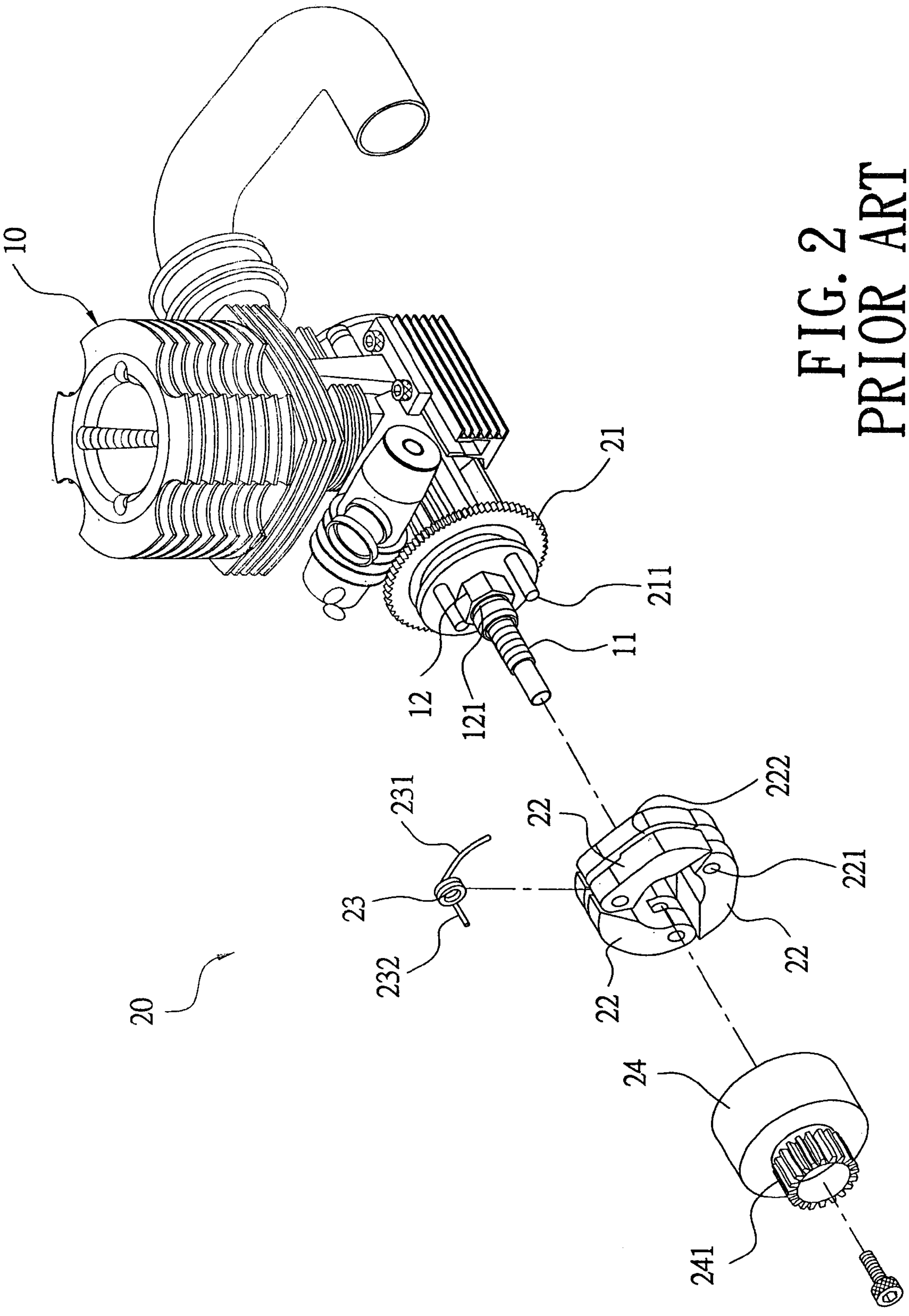
FIG. 2 PRIOR ART
FIG. 2 is an exploded perspective view of the conventional clutch with the model-car engine.
Figure 3:
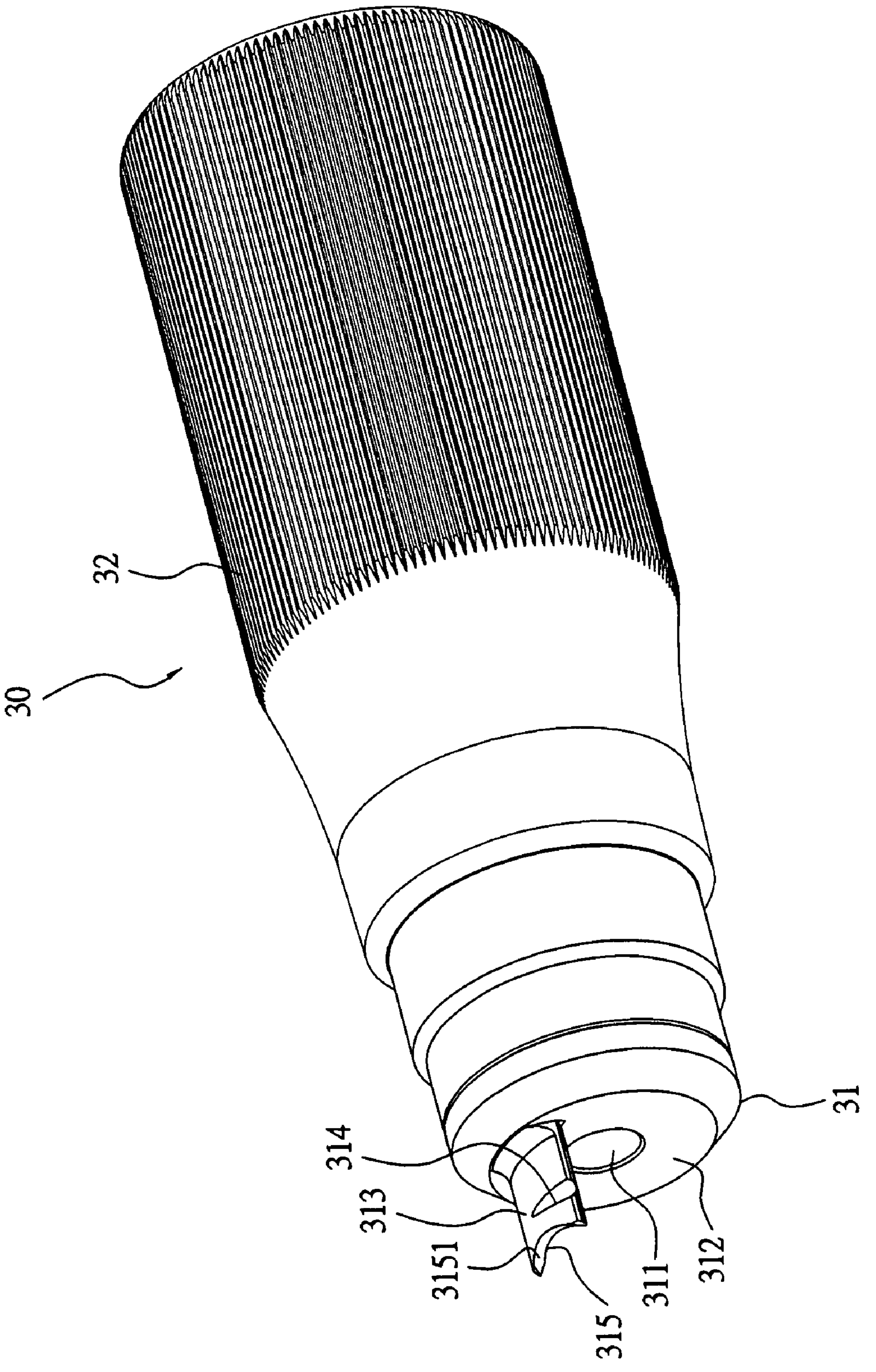
FIG. 3 is a perspective view of a special tool for assembling and disassembling a remote-controllable model-car engine clutch.
Figure 4:
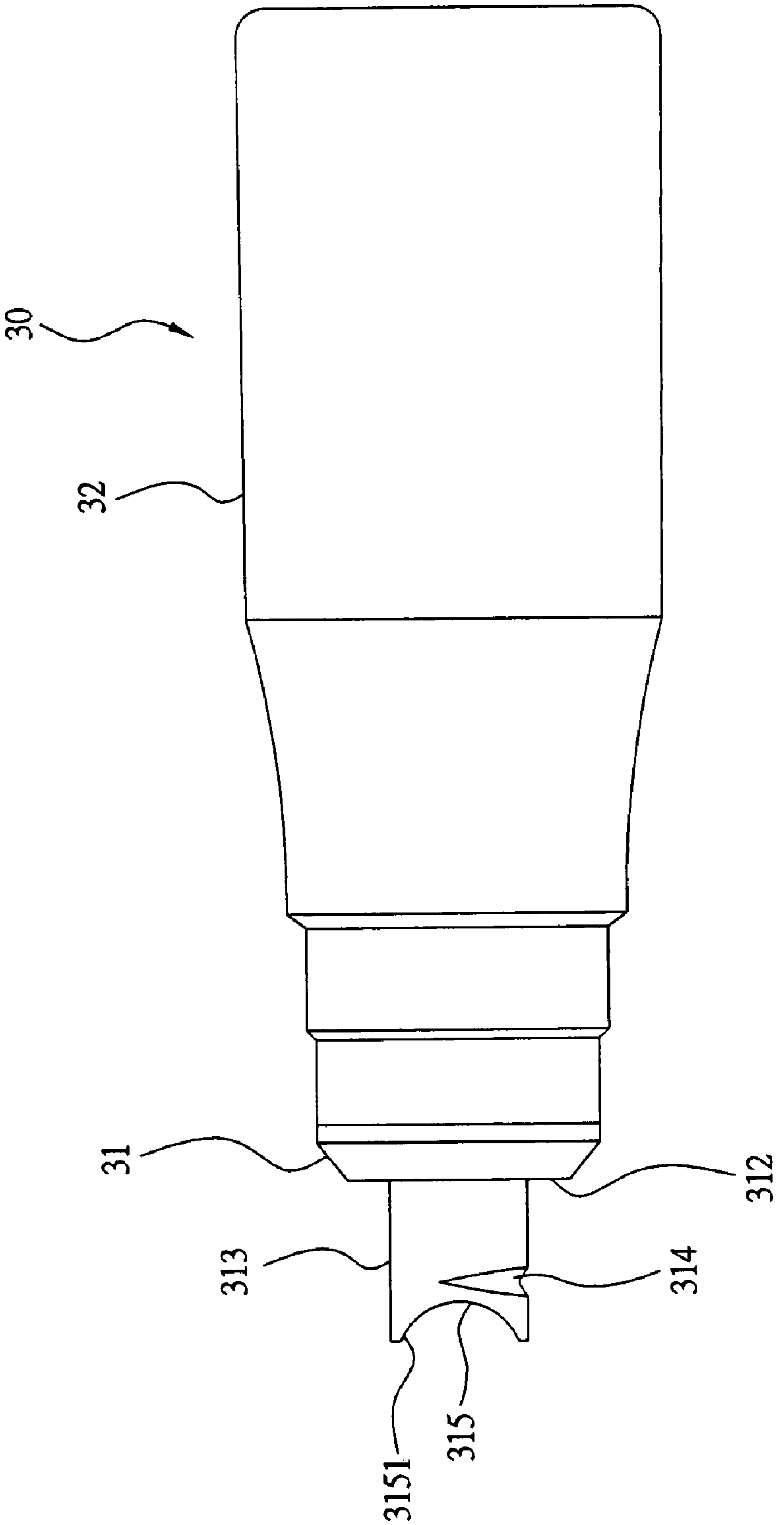
FIG. 4 is a front view of the special tool for assembling and disassembling a remote-controllable model-car engine clutch in the present invention.
Figure 5:
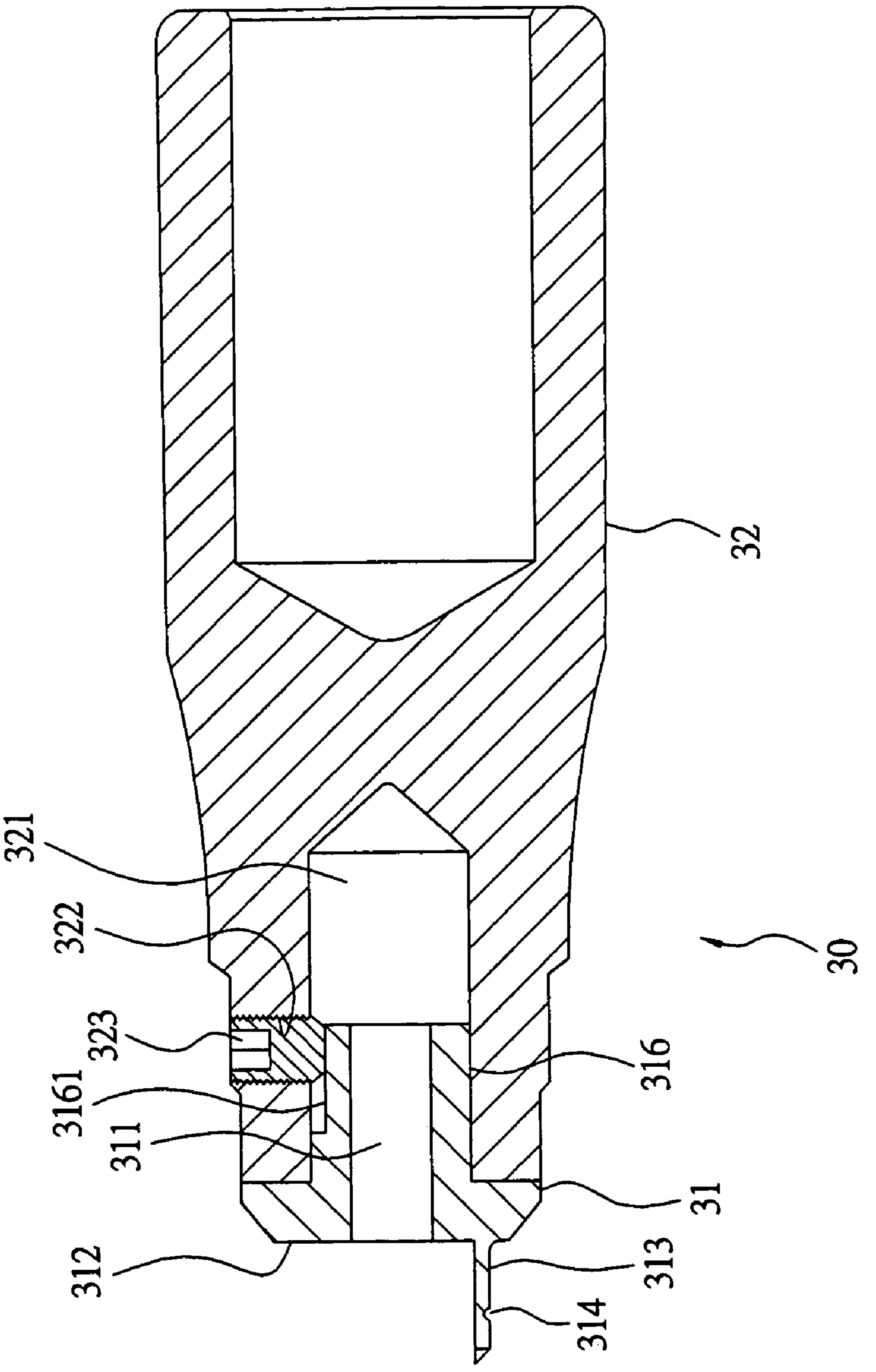
FIG. 5 is a side cross-sectional view of the special tool for assembling and disassembling remote-controllable model-car engine clutch in the present invention.

A preferred embodiment of a special tool 30 for assembling and disassembling a remote-controllable model-car engine clutch in the present invention, as shown in FIGS. 3, 4 and 5, is applicable to the grasps 22 of the conventional engine 20 of a remote-controllable model-car engine, with the structure of the engine clutch and the engine being completely the same as described in the Prior Art. The special tool 30 includes a head 31 with high rigidity and a grip 32 of a circular shape.

The head 31 has a center through hole 311 for receiving the end section of the spindle 11 of an engine 10, and a head end 312 provided with a curved prying claw 313 with its curvature being a part of a circle with its center as the axle of the head 31. The prying claw 313 also has an engage groove 314 formed laterally and shallowly in an intermediate portion to extend from one vertical side toward the other vertical side but not reaching the other vertical side, and a concave pushing groove 315 formed in an upper end surface, and a engaging edge 3151 respectively formed along the two sides of the pushing groove 315. The head 31 further has a lower insert portion 316 of a circular shape, and a flat surface 3161 formed on an outer surface of the lower insert portion 316.

The grip 32 is independently formed from the head 31, having an insert hole 321 in an upper end section for receiving the lower insert portion 316 of the head 31, a threaded hole 322 formed laterally in an outer wall defining the insert hole 322 to screw with a nut 323, which then screws therein down to tightly fix the head 31 with the grip 32 by tensely sticking against the flat surface 3161.

Now, how to assemble and disassemble the grasps 22 is to be described as below.

Figure 6:
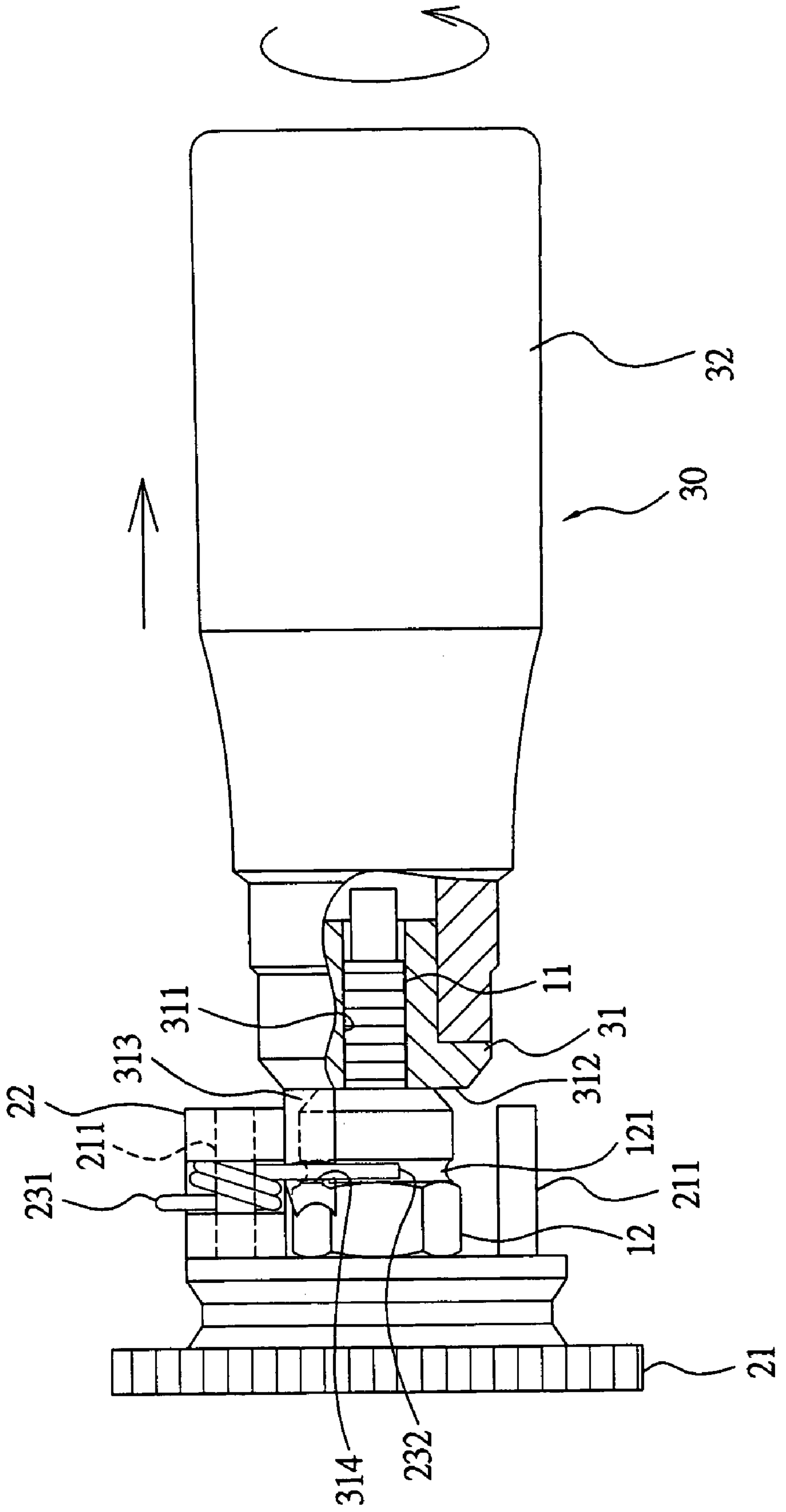
FIG. 6 is a cross-sectional view of the special tool in disassembling movement for an engine clutch in the present invention.

(1) In disassembling, as shown in FIG. 6, at first decide which grasp is to be disassembled, and then align the center through hole 311 of the head 31 of the special tool 30 to the spindle 11, and at the same time let the prying claw 313 face to the side of the chosen grasp 22. Then the special tool 30 is pushed toward the clutch 20, letting the center hole 314 fit around the spindle 11, with the upper end surface of the prying claw 313 just contacting the upper edge of the nut 12, and with the engage groove 314 positioned just the side of the second end 232 of a torsion spring 23 of each grasp 22. At this time, a user only rotates the special tool 30 in a preset direction, placing the second end 232 of the torsion spring 23 in the pushing groove 314 to release the second end 232 from the nut 12. Then the user pulls the special tool 30 outward, and the chosen grasp 22 together with the torsion spring 23 is separated from one of the posts 211 of the base 21. In this way, all the grasps 22 can be disassembled from the base 21 of the engine 10 one by one, easily finishing the disassembling work.

Figure 7:
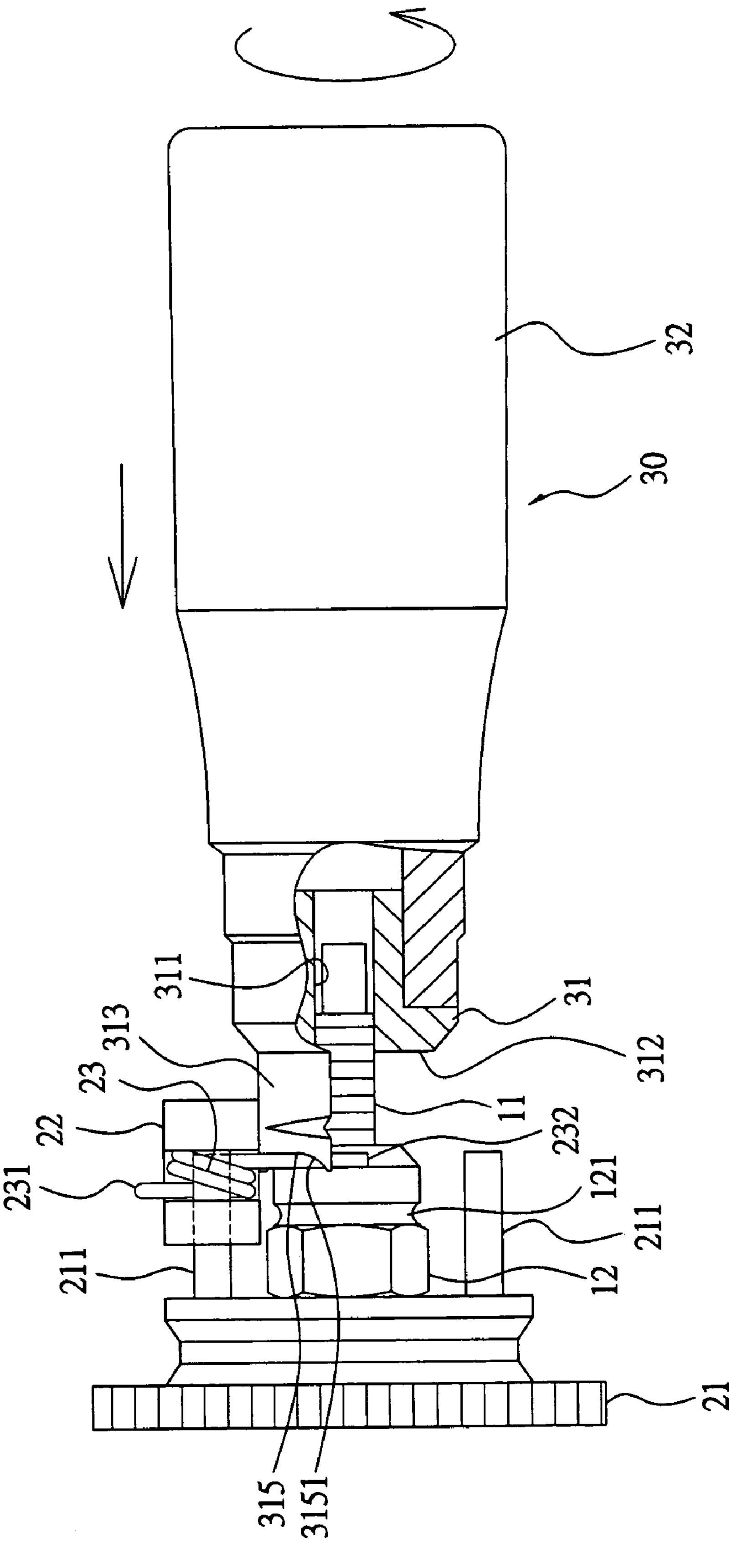
FIG. 7 is a cross-sectional view of the special tool in assembling movement for an engine clutch in the present invention; and, FIG. 8 is a front view of another embodiment of an actuating piece of a special tool for assembling and disassembling a remote-controllable model-car engine clutch in the present invention.

(2) In assembling with the special tool 30, as shown in FIG. 7, place one of the post holes 221 of the clutch 22 partly around one of the posts 211, and then align the center through hole 311 of the head 31 to the spindle 11. At the same time, align the pushing groove 315 of the prying claw 313 to the inner side of the end 232 of the torsion spring 23 of each grasp 22, then rotate the special tool 30 in a preset direction, letting the second end 232 of the torsion spring 23 pried open by the pushing groove 315 of the prying claw 313 to one side of the groove edge 3151, and with the grasp 22 together with its torque spring 23 completely fitting around the post 211 of the base 21. And in this condition, the second end 232 of the torsion spring 22 positioned to faced the annular position groove 121 of the nut 12 can be automatically moved to fit into the annular position groove 121 by rotating the special tool 30. Then the special tool 30 is pulled toward above the base 21 after the torsion spring 23 is completely stabilized. In this way all of the grasps 22 can be assembled one by one on the base 21 of the engine 10, finishing assembling of the clutch 20.

Figure 8:
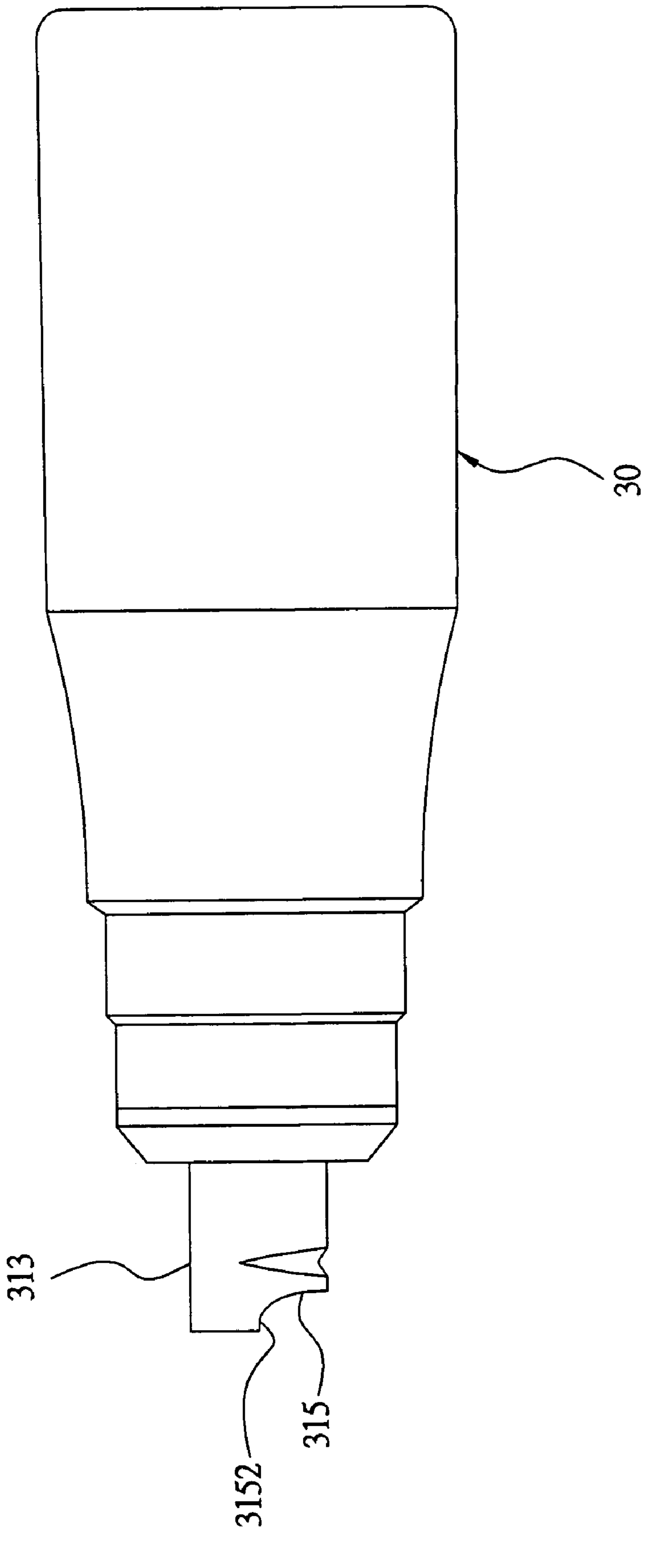

Next, FIG. 8 shows another embodiment of a prying claw 313 of a special tool 30 for assembly and disassembling a remote-controllable model-car engine clutch, which has almost the same structure as the first embodiment of the special tool 30 except a pushing groove 315 with a curved engage edge 3125 formed on one side of the upper end in the direction of prying open the second end 232 of the torsion spring 23. So the prying claw 313 can pry open the torsion spring 23 by the curved engage edge 3125 for assembling and disassembling the grasps 22 of the clutch 20 from t h e base 12.

The special tool for assembling and disassembling a remote-controllable model-car engine clutch according to the invention has the following advantages, as can be understood from the foresaid description.

1. It has only one piece, possible for both assembling and disassembling the engine clutch, upgrading convenience in using, without possibility of making a mistake in using.
2. It can lower the cost for production and package, acquiring economic gain not a little.
3. The torsion spring 23 may not slide off the pushing groove 315 by the pushing groove 315 moved to force the torque spring 23 together with each of the grasps 22 combine with the base 21, facilitating handling of assembling and disassembling.

While the preferred embodiment of the invention has been described, it will be recognized and understood that various modifications may be made therein and the appended claims are intended to cover all such modifications that may fall within the spirit and scope of the invention.

What is claimed is:

1. A special tool for assembling and disassembling a remote-controllable model-car engine clutch comprising:

a) a head having:
   i) a center through hole extending from a head end to an insert end;
   ii) a curved prying claw extending outwardly from a periphery of the head end;
   iii) an engaging groove located on an exterior of the curved prying claw;
   iv) a concave pushing groove located in end of the curved prying claw opposite the head end; and
   v) an insert portion located on the insert end; and
b) a grip having:
   i) an insert hole located in an end thereof, the insert portion of the head being inserted into the insert hole; and
   ii) a threaded hole located on a side thereof and having a nut threadedly connected therein, the threaded hole communicating with the insert hole, the nut selectively locking and unlocking the head in the grip.

2. The special tool according to claim 1, wherein a curvature of the curved prying claw and a curvature of the head have a common axis.

3. The special tool according to claim 1, wherein the concave pushing groove has an engaging edge located on each of two sides thereof.

4. The special tool according to claim 1, wherein the insert portion has a flat surface located on a portion of the exterior surface thereof, the nut selectively engaging the flat surface.

5. The special tool according to claim 1, wherein the insert portion has an exterior surface with a circular cross section.

6. The special tool according to claim 1, wherein the grip has an exterior surface with a circular cross section.

7. The special tool according to claim 1, wherein the engaging groove has a length less than a width of the curved prying claw, the engaging groove extending from a first lateral side toward a second lateral side of the curved prying claw.

8. The special tool according to claim 1, wherein the center through hole of the head communicating with the insert hole of the grip.

* * * * *